Patented July 14, 1931

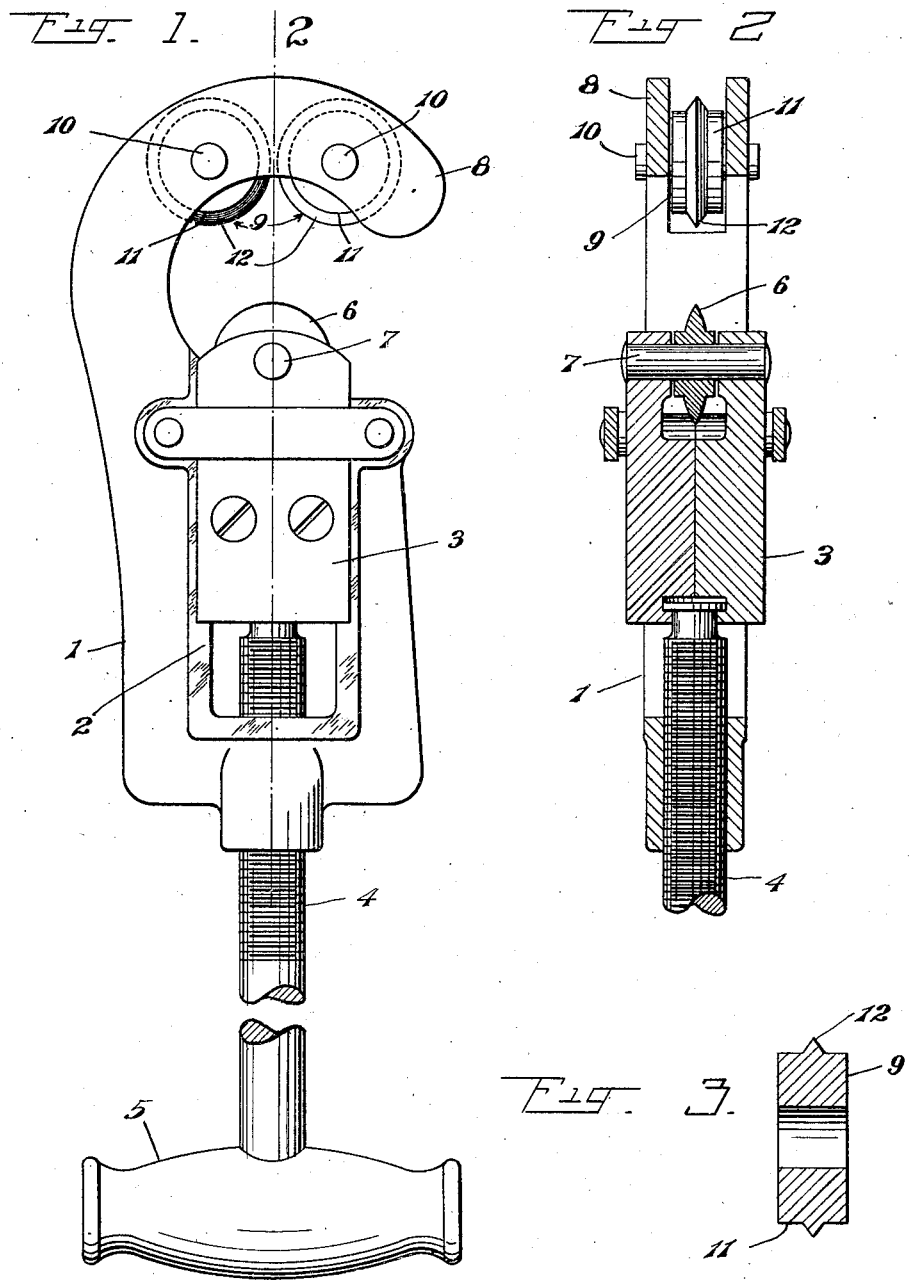

1,814,763

UNITED STATES PATENT OFFICE

CHARLES NEUBAUER, OF BRIDGEPORT, CONNECTICUT, ASSIGNOR TO THE ARMSTRONG MFG. CO., OF BRIDGEPORT, CONNECTICUT, A CORPORATION OF CONNECTICUT

CUTTING TOOL

Application filed December 23, 1927. Serial No. 242,067.

This invention relates to cutting tools and is illustrated as applied to a hand operated tool for cutting pipe, although it is to be understood that the invention is not restricted to the particular adaptation herein shown.

The objects of the invention are to provide a cutting tool having maximum efficiency; to employ a plurality of cutters; to combine use of rollers with the plurality of cutters; to obtain proper tracking of the cutters; to secure a smooth cut and at the same time to roll the burr out; to incorporate the advantages of multiple cutter tools with those of single cutter tools as heretofore constructed; to secure simplicity of construction and operation; and to obtain other advantages and results as may be brought out in the following description.

Referring to the accompanying drawings, in which like numerals of reference indicate similar parts throughout the several views;

Figure 1 is a side elevation of a cutting tool embodying my invention;

Figure 2 is a sectional view on line 2—2 of Fig. 1; and

Figure 3 is a sectional view of one of the combined cutters and rollers.

In the specific embodiment of the invention illustrated in the said drawings, the reference numeral 1 indicates a suitable housing of usual or special design providing a longitudinal slide-way 2 for a holder 3 which can be slid back and forth by suitable means such as a screw 4 operable by a handle 5, or otherwise. In one end of the said holder 3 is rotatably mounted a main cutter 6. This cutter may be similar to cutters heretofore employed in tools of this character, preferably rotatably mounted upon a pin or axle 7 and having a cutting depth greater than the thickness of the article, such as pipe, which is to be cut.

The housing 1, as shown, provides a hooked end 8 and mounted in this hooked end I preferably provide two rotatable members 9, 9. Heretofore cutting tools have been manufactured having the same general characteristics as heretofore described, so that those skilled in the art will appreciate that the said rotatable members 9, 9 are arranged with respect to the cutter 6 so as to obtain a three point contact with the article such as pipe, which is to be cut. In the tools as heretofore constructed it has some times been the practice to employ rotatable members in place of those which I herein illustrate, which are cutters of the same character as the single cutter carried by the movable member. Such a construction has certain advantages, such as perfect tracking and a clean, smooth cut, as well as enabling the cut to be performed quite rapidly. Other tools have been made wherein the rotatable members corresponding to members 9 herein are merely rollers which counteract the pressure exerted on the cutter. Such a tool also has advantages, the most marked of which is the fact that the rollers operate to smooth down the burr which is raised by the cutter forcing its way into the middle. The necessity of eliminating such a burr is quite important as it is difficult, and some times impossible to thread a pipe or the like with an ordinary pipe die with the end of the pipe thus distorted.

In the present invention I have devised means whereby the advantages of both of the old style cutting tools may be obtained, and in carrying out the invention I provide members 9 which are in the nature of rollers and also have characteristics of cutters. It is to be observed that these members 9 are each mounted upon axles or pins 10 so as to be freely rotatable and that they have an axial length substantially that of the usual roller heretofore employed in the single cutter type of cutting tool, and providing peripheral roller surfaces 11. Peripherally around each of said members, is a relatively shallow ridge 12 which tapers outwardly to an edge and will operate as a cutter. This ridge or cutter 12, projects from the roller surfaces 11 a distance less than the depth of the main cutter 6, and less than the thickness of the material to be cut. Consequently I provide a three point contact with the pipe or the like being cut and provide a plurality of cutters for making the first part of the cut. As shown in the drawings, the shallow cutters 12 have a proportionately greater flare than the other or main cutter 6, so as to open the groove laterally for the effective depth of the shallow cutters and thus enable the main cutter to operate more particularly, to deepen the cut. As the cut progresses to the depth of the cutters 12 on the members 9, the roller surfaces 11 begin to function to roll down the burr while the single cutter 6 continues to complete the cut. It will furthermore be noted that by virute of the proportionately greater flare of the shallow cutter than of the main cutter, that the shallow cutter combines with the rolling surface thereof to roll out the burr already formed without the burr binding against the side of the main cutter and without the cutter throwing up an additional burr as fast as the rollers press the burr down as occurs in the old type of pipe cutting tools. At the depth of cut where the roller surfaces 11 begin to function, the need of a plurality of cutters for tracking purposes no longer exists since the main cutter is properly guided in the groove which is then of suitable depth. However, the cutters 12 projecting from the roller surfaces are still riding within the groove or cut, and will function to prevent any material deflection as the cut progresses.

Obviously the invention is not restricted to application to the specific tool herein illustrated, and other detail changes and modifications may be made in the construction and use of my invention without departing from the spirit or scope thereof, and I do not wish to be understood as limiting myself to the exact structure shown except as set forth in the following claim when construed in the light of the prior art.

Having thus described my invention, I claim:—

A cutting tool comprising a plurality of cutters, one of said cutters having a less depth than the other or main cutter and a proportionately greater flare than the other cutter so as to open the groove laterally for the effective depth of that cutter while the other cutter deepens the groove, said shallow cutter having co-axial cylindrical shoulders at the base thereof for cooperating therewith to roll down a burr on the pipe and to simultaneously maintain a groove in the pipe wider than the main cutter so as to avoid again raising a burr by return passage of the main cutter around the groove.

CHARLES NEUBAUER.